(12) United States Patent
Creeden et al.

(10) Patent No.: US 8,717,668 B1
(45) Date of Patent: May 6, 2014

(54) TRANSPORT FIBER AMPLIFIER FOR BEAM QUALITY IMPROVEMENT

(75) Inventors: Daniel J Creeden, Nashua, NH (US); Peter A Budni, Nashua, NH (US); Robert C Guyer, Beverly, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 212 days.

(21) Appl. No.: 13/466,996

(22) Filed: May 8, 2012

Related U.S. Application Data

(60) Provisional application No. 61/494,471, filed on Jun. 8, 2011.

(51) Int. Cl.
*H01S 3/098* (2006.01)
(52) U.S. Cl.
USPC .......................................... 359/337; 359/337.2

(58) Field of Classification Search
USPC ................................ 359/337, 340, 333, 337.2
See application file for complete search history.

(56) References Cited

U.S. PATENT DOCUMENTS

| | | | |
|---|---|---|---|
| 5,864,644 A * | 1/1999 | DiGiovanni et al. | 385/43 |
| 2005/0041702 A1 * | 2/2005 | Fermann et al. | 372/25 |
| 2008/0123694 A1 | 5/2008 | Nakamae et al. | |
| 2010/0110535 A1 | 5/2010 | Murison et al. | |
| 2010/0188734 A1 | 7/2010 | Grudinin et al. | |
| 2011/0007760 A1 | 1/2011 | Clowes et al. | |
| 2011/0122902 A1 * | 5/2011 | Shima | 372/27 |

\* cited by examiner

*Primary Examiner* — Mark Hellner
(74) *Attorney, Agent, or Firm* — Joseph E. Funk; Daniel J. Long

(57) ABSTRACT

A combined large mode area, fiber cable amplifier and laser beam transport fiber cable is disclosed that transports laser beams output from a compact, high power, solid state laser to remote locations while improving the beam quality and amplifying the beam to compensate for losses in the fiber cable. The fiber cable is clad and is cladding pumped to compensate for the losses in the fiber cable.

19 Claims, 1 Drawing Sheet

TRANSPORT FIBER AMPLIFIER FOR BEAM QUALITY IMPROVEMENT

CROSS REFERENCE TO RELATED APPLICATIONS

This application claims the benefit of Provisional Patent Application Ser. No. 61/494,471 filed Jun. 8, 2011.

FIELD OF THE INVENTION

This invention relates to lasers and more particularly to methods and apparatus for improving transport of a laser beam through an optical fiber.

BACKGROUND OF THE INVENTION

In the prior art, non-diffraction limited laser beams from high power laser sources often have to be transported from a laser source to a remote location that is many feet away. Passive silica fibers are normally used for transporting laser light from its source to the remote location. Passive silica fibers are also used for connecting components in fiber-optic devices, such as interferometers and fiber lasers. They then play a similar role as electrical wires do in electronic devices.

However, traditional passive silica fibers are lossy, especially over long lengths. The beam quality can be made better but it is at the expense of a power loss. In addition, traditional multi-mode passive fibers make a laser beam more highly moded which also affects system performance, particularly if only one mode is desired. To solve these problems the prior art has required that relatively complex and costly optical amplifiers and other optical equipment be utilized to amplify and restore degraded laser beams.

In addition, when high power laser beams are generated for transmission through ordinary passive silica fibers, which typically carry single mode beams, the limitations in the amount of power a single fiber can carry requires that multiple apertures and multiple fibers be utilized. The source laser beam must be divided and is routed through each fiber before recombining them. The multiple fibers are typically small diameter single-mode fibers. Accomplishing this is somewhat complex and costly to implement.

In addition, efficiently launching laser light into single-mode fibers usually requires a laser source with good beam quality and precise alignment of the focusing optics in order to achieve mode matching. This requires more complex and costly components. As described below, compact solid state lasers typically have poor beam quality so are not acceptable for this purpose. Thus, small single-mode fibers generally are not useful as transport fibers carrying laser light from high power solid state lasers.

To get around this problem large core fibers are usually utilized but large-core fibers tend to be multimode which degrades the beam quality. This occurs because the number of transverse modes and higher order modes supported by a fiber is proportional to the core diameter. The multimodes include a primary mode that is of interest, and many transverse and higher order modes that may not be of interest. The unwanted modes take some of the power that is generated by the high power solid state laser that is driving the transport fiber and thereby decrease the efficiency at the primary mode of interest.

Further, working with high power solid state lasers, many of them are not diffraction-limited and this results in a coupling loss into the passive fibers which typically transport single-mode beams. These fibers can be designed to accept multimode light, but the output from the fiber will be multimode as well which is not wanted.

When compact (small or short), high power, solid state lasers are utilized, when mounting space is small, other problems exist. Mainly, as previously mentioned, the beam quality from these compact solid state lasers begins to degrade. However, from a favorable standpoint such compact solid state lasers save weight, are smaller, can generate favorable power and have good spectral and/or temporal characteristics. Such solid state lasers are typically diode pumped in a manner known in the art.

Thus, there is a need for a way to transport laser beams output from a compact, high power, solid state laser that alleviates the above described beam quality and loss problems in the prior art in a simple and cost effective way.

SUMMARY OF THE INVENTION

The above described need in the prior art for a way to transport laser beams output from a compact, high power, solid state laser through a clad fiber cable in a way that alleviates the beam quality problems and loss in the prior art in a simple and cost effective way.

A compact (small or short), high power, diode pumped, solid state laser is utilized when mounting space is small. The beam quality of this type of laser is known to be poor, although other features of the high power laser are good. Instead of using multiple single mode cables to transport the high power laser beam to a remote location a single, large mode area (LMA) fiber cable amplifier comprising a larger diameter, doped fiber cable is utilized to both amplify the laser beam and to transport it from the compact, high power, solid state laser to a somewhat remote location. This is done in a simpler and more cost effective way than done in the prior art. LMA fibers have core areas more than an order of magnitude larger than those of single mode fibers. The doped, clad fiber cable operates as a fiber amplifier while, at the same time, functioning as a transport cable. The combined fiber amplifier and transport cable is cladding pumped.

The doped fiber of the fiber amplifier doubles as a transport fiber that relatively long and is, at least, partially coiled to achieve the goals of the invention. The length of the fiber cable depends on the distance the laser beam is to be transported, the cladding pump wavelength chosen, the gain to be achieved by the fiber amplifier, and the dopant concentration in the fiber cable.

The coiled portion of the fiber amplifier and transport cable introduces losses (bending loss) that are compensated for by the amplification of the fiber amplifier, and the bending helps filter out unwanted higher order and transverse modes to improve beam quality. The result is a single mode, near diffraction limited output versus the multimode input to the amplifier/transport cable from the high power solid state laser. In addition, the laser beam output from combined fiber amplifier and transport cable has a brighter beam than could be achieved with the solid state laser alone or with a conventional passive fiber transport system.

The result is a way to transport a high power laser beam over a distance while eliminating higher order and transverse modes, leaving only a single primary mode beam, improving beam quality, and amplifying the laser beam to compensate for any loss in the cable. At the output of the fiber amplifier transport cable is a near diffraction limited beam. The output power from fiber amplifier transport cable can be equal to or greater than that which was launched at the input of the fiber amplifier transport cable, depending on the amount of fiber pump power, but with a better beam quality.

The fiber cable is usually made of silica that is doped, but it may be phosphate glass or other silica compositions. For example, photonic crystal fibers (peFs) may be used as the gain fiber in the fiber amplifier as they allow for a larger core diameter than traditional fibers.

DESCRIPTION OF THE DRAWINGS

The invention will be better understood on reading the Detailed Description in conjunction with the drawings in which.

DETAILED DESCRIPTION

Figure 1:
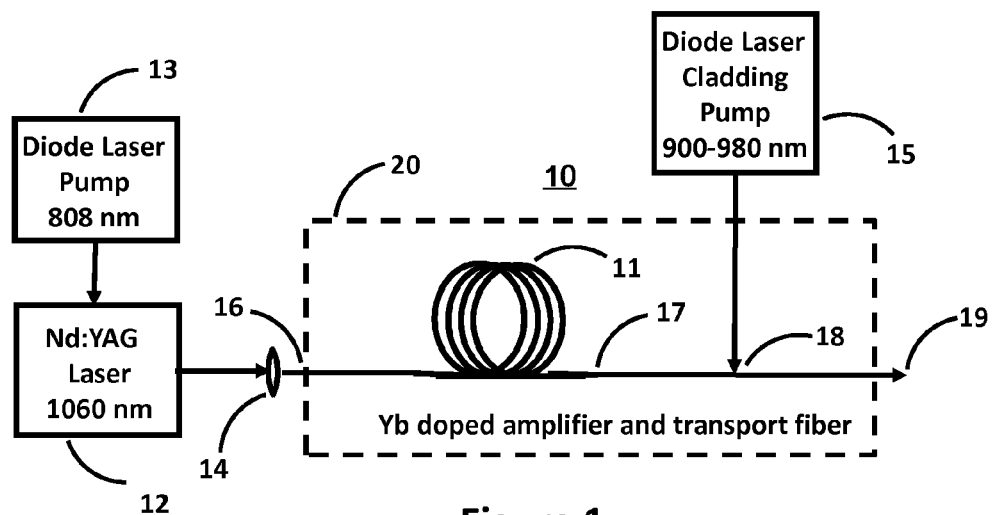
FIG. 1 shows a first embodiment of the novel transport fiber and fiber amplifier that provides beam transport while improving beam quality.

In FIG. 1 is shown one embodiment of the invention. It is a combined fiber cable amplifier and laser beam transport 10 comprising a relatively long, doped fiber cable 17 that is partially coiled 11. The combined function as a fiber amplifier and a 1060 nanometer transport cable are in lieu of a passive silica fiber cable that is conventionally used in the prior art as a transport cable, plus other optical components functioning therewith. One application of the invention is with a compact, high power, diode pumped 13 solid state laser system 12 utilized in applications where space is at a premium. Laser 12 is pumped by a diode laser pump 13. Some components ordinarily used in prior art laser systems are eliminated. Small, compact, high powered, solid state lasers have deficiencies that preclude their use in applications where high power, high beam quality, single mode, laser beams are required. However, these solid state lasers are compact and save weight, size and power.

Using a very long fiber 17 for the fiber amplifier 10, that also functions as a transport fiber cable, to transport the laser beam generated by solid state laser 12 over relatively long distances with minimal coupling losses (as the fiber can be designed to accept the input laser beam) enhances the beam quality of the high power laser beam from solid state laser 12. This advantage is accomplished by utilizing a long, coiled, large mode area fiber cable 10 that is doped and is cladding pumped to operate as a fiber amplifier. As a result the transport of the laser beam is not lossy, as when using a passive fiber cable as in the prior art, because the wavelength of the laser beam is at the fundamental, operational wavelength of the fiber cable amplifier. The output power will actually increase during transport through the cable. In addition, the beam quality is improved because unwanted modes output from the solid state laser are stripped off leaving a desired single mode output. More specifically, the coiled 11 large mode area fiber amplifier cable 17 filters out unwanted higher order modes and tranverse modes leaving only a high power, high quality, single mode, laser beam at its output 19. More specifically, the unwanted higher order modes and transverse modes output from laser oscillator 12 are launched into the cladding such that only the fundamental mode in the fiber core is amplified and output from fiber amplifier 10. Power loss caused by filtering out unwanted modes and normal power loss in the fiber cable are compensated for by the amplification created by the fiber amplifier 10.

In FIG. 1 is shown a first embodiment of the invention in which high power solid state laser 12 generates an output having a wavelength of 1060 nanometer, and is preferably a Nd:YAG laser that is pumped by diode laser pump 13. Diode laser pump 13 has an output wavelength of 808 nanometers with sufficient power so that solid state laser 12 can output the power levels indicated herein. The cladding pump 15 power level depends on the application, but it is from 20 Watts to greater than 200 Watts as is practical and required for the embodiments of the invention disclosed herein. More cladding pump power means more output signal. Typical diode laser cladding pumps are fiber-coupled single emitters, bars, or VECSELS. Some manufacturers, for example, are IPG, nLight, DILAS, JDSU, and Coherent.

Laser 12 operates at 1060 nanometers with a beam quality of $M^2=2$ which poorer beam quality is improved by the novel combined laser amplifier and transport cable 10. $M^2$ is a widely used dimensionless beam propagation quality parameter and the definition adopted hereafter is the same provided in the current ISO Standard for beam quality characterization (ISO 11146). For best beam quality M2=1. Such solid state lasers are well known in the art and are not described in greater detail herein. Similarly, a Tm:YALO or a Ho:YAG solid state laser may be coupled into a combined Tm-doped fiber amplifier and transport cable.

A basic premise of this system is that a fiber must be chosen so that of the laser light from the high power laser source 12 can be easily coupled into the input end 14 of the combined fiber amplifier and laser beam transport 10. The laser beam output from laser 12 is focused onto the input end of doped cable 17 by a lens 16. In one embodiment of the invention transport cable 17 is doped with Ytterbium (Yb) and is preferred because of its low quantum defect and high gain. In another embodiment the dopant is Thulium (Tm). A typical fiber which can be used is Nufern's PLMA-YDF-20/400 cable which is ideal for high power amplifiers. This fiber has a core diameter of 20 μm, is double clad with a cladding diameter of 405 μm and a core numerical aperture (NA) of 0.065. In addition, this doped cable 17 is a large mode area (LMA) cable that has a larger diameter than single mode passive fiber cables, and can transport the high power laser beam output from compact, high power, solid state laser 12.

Transport fiber cable 17 doped with Yb is long and some of it is coiled as shown at 11. In the process of amplified transport through the coiled portion 11 of fiber 17, the higher order and transverse modes output from the laser oscillator are launched into the cladding such that only the fundamental mode in the fiber core is amplified and output from fiber amplifier 10. At the output 19 of fiber amplifier 10 the result is a near diffraction-limited beam at 1060 nanometers having a beam quality of almost $M^2=1$ (which is a pure Gaussian beam), rather than a $M^2=2$ diffraction-limited beam which would have resulted from the solid state laser alone and passed through a passive fiber cable. A near diffraction limited beam is defined as one whose beam quality is $M^2<1.5$.

While silica fiber is referenced herein the invention is not limited to a silica transport fiber. Phosphate glass or other silica compositions (germanium, aluminum and other similar compositions) may be used. In addition, photonic crystal fibers (PCFs) can be used as the gain fiber, as they allow for a large core diameter than traditional fibers.

In FIG. 1 combined fiber amplifier and transport fiber 17 has a cladding that is pumped by a diode laser 15 in a manner known in the art. While diode laser cladding pump 15 is shown near the output end 19 of cable 17 it may also be near the input end 14 of fiber 17. Cladding pump laser 15 can be operated at various wavelengths in the 900-980 nanometer range for the Yb doped fiber. The length of fiber 17 for this application would depend on the pump wavelength chosen. For example, if one is pumping transport amplifier 17 at 915 nanometers, a fiber cable length of about 70 feet would be chosen. In addition, the length of fiber cable 17 is dependent on the concentration of the dopant and fiber non-linear effects. For most practical applications a cable length of 20 meters or less should be more than sufficient. For silica fiber cables dopants range from 2%-4% by weight. For phosphate fiber cables, dopant concentrations can exceed 10% (which translates to more absorption and thus less fiber length). Phosphate fiber cables can also be doped with lower concentrations of dopants. As previously mentioned regarding FIG. 1 the cable is doped with Ytterbium (Yb) and is preferred because of its low quantum defect and high gain. In the embodiment described with reference to FIG. 2 the dopant is Thulium (Tm).

The Yb doped fiber 17 has a cladding absorption of 0.5 dB/meter at 915 nanometers and 1.5 dB/meter at 975 nanometers. A typical rule of thumb for fiber pump absorption in Yb doped fiber is 13 dB, so 69 feet of fiber would provide about 13 dB of pump absorption. In such a configuration, the amount of gain in this fiber amplifier 10 would depend on both the amount of laser input power/energy from solid state laser 12 as well as the amount of 915 nanometer pump power. If the power from solid state laser 12 into cable 17 is low (<1 W average), then fiber amplifier 10 will operate in the small signal gain region, allowing for high optical gain (>20 dB) with relatively low extraction efficiency in fiber amplifier 10. If the power from laser 12 into cable 17 is high (>5 W average), then the fiber amplifier 10 will operate in its saturated gain region, where the overall gain will be low (<13 dB), but the extraction efficiency will be very high, with typical efficiencies exceeding 50%.

Figure 2:
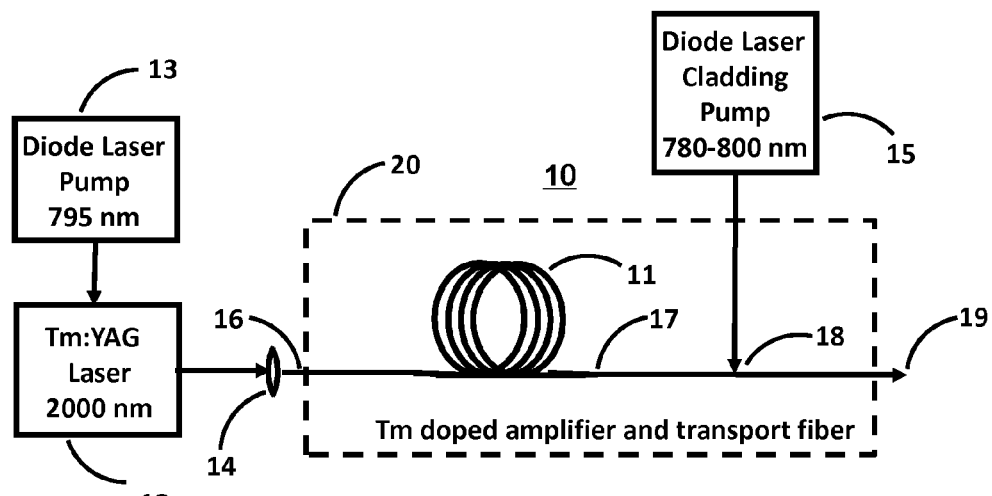
FIG. 2 shows a second embodiment of the novel transport fiber and fiber amplifier that provides beam transport while improving beam quality.

In FIG. 2 is shown an alternative embodiment of the invention in which high power solid state laser 23 is preferably a solid state Tm:YAG or Tm:YALO laser that is pumped by diode laser pump 13 and generates an output having a wavelength of 2000 nanometers. Cable 17 is partially coiled and functions as a combined fiber cable amplifier and transport cable. Features and functions of the invention are the same as those described with reference to FIG. 1.

As previously mentioned silica fiber cables are doped in the range of 2%-4% by weight. For phosphate fiber cables, dopant concentrations can exceed 10% (which translates to more absorption and thus less fiber length). Phosphate fiber cables can also be doped with lower concentrations of dopants. In the embodiment described with reference to FIG. 2 the dopant is Thulium (Tm).

Diode laser pump 13 has an output wavelength of 795 nanometers, but may be a little higher, with sufficient power so that solid state laser 12 can output the power levels indicated herein. The cladding pump power level depends on the application, but from 20 Watts to greater than 200 Watts is practical for the embodiments of the invention disclosed herein. More cladding pump power means more output signal. Typical diode laser cladding pumps are fiber-coupled single emitters, bars, or VECSELS. Some manufacturers, for example, are IPG, nLight, DILAS, JDSU, and Coherent.

Laser 12 preferably operates at 2000 nanometers with a beam quality of $M^3=2$ which beam quality is improved by the novel combined laser amplifier and transport cable 17. Such lasers are well known in the art and are not described in greater detail herein.

Again a basic premise of the system is that a fiber must be chosen so that of the laser light from the high power laser source 12 can be coupled into the input end 14 of the combined fiber amplifier and laser beam transport 10 by a lens 16. Transport cable 17 is doped with Thulium (Tm) and is preferred because of its low quantum defect and high gain. A typical fiber cable that can be used is Nufern's PLMA-TDF-25P/400 cable. This fiber has a core diameter of 25 µm, a cladding diameter of 400 µm and a core numerical aperture of 0.09. In addition, this doped cable 17 is a large mode area (LMA) cable that has a larger diameter than single mode passive fiber cables, and can transport the high power laser beam output from compact, high power, solid state laser 12.

In the embodiment of the invention shown in FIG. 2 the diode cladding pump will operate in the range of 780 nm-800 nm. The diode cladding pump 15 absorption in cable 17 is 2.4 dB/m at about 795 nanometers and provides gain in the 1.8-2.2 micrometer region. For this case, a fiber length of 15 feet would be used to provide adequate absorption of diode cladding pump 15. If a longer fiber length is required for transport, a fiber with a lower concentration of Thulium dopant could be used, or the fiber could be pumped off-wavelength. For example, fiber 17 could be cladding pumped at 795 nanometers, which effectively reduces the absorption by a factor of 2, so a 30 foot fiber length could be used. Again, the amount of gain in this fiber amplifier 10 would depend on both the amount of laser input power/energy from laser 12 as well as the amount of power at 795 nanometer from cladding pump 15.

Transport fiber cable 17 doped with Tm is relatively long and some of it is coiled as shown at 11. In the process of amplified transport through the coiled portion 11 of fiber 17, the higher order and transverse modes output from the laser oscillator are launched into the cladding such that only the fundamental mode in the fiber core is amplified and output from fiber amplifier 10. At the output 19 of fiber amplifier 10 the result is a near diffraction-limited beam at 2000 nanometers, rather than a 2× diffraction-limited beam which would have resulted from the oscillator alone and passed through a passive fiber cable.

While silica fiber is referenced herein the invention is not limited to a silica transport fiber. Phosphate glass or other silica compositions (germanium, aluminum and other similar compositions) may be used. In addition, photonic crystal fibers (PCFs) can be used as the gain fiber, as they allow for a large core diameter than traditional fibers.

In FIG. 2 combined fiber amplifier and transport fiber 17 have a cladding that is pumped by a diode laser 15 in a manner known in the art. While FIG. 2 shows diode laser cladding pump near the output end 19 of cable 17 it may also be near the input end 14 of fiber 17. Cladding pump laser 15 outputs in the 790 nanometer range, but can be operated at various wavelengths in the 1500-1700 nanometer range, albeit with lower absorption per unit length of fiber, depending on the length of cable 17 and other factors. Examples of diode manufacturers are Intense, nLight, DILAS and LIMO. There may be more than one cladding pump diode lasers but they usually will be at the same end of cable 17.

While what has been described herein is a preferred embodiment of the invention, it is to be understood that other embodiments may be made, and modifications and additions may be made to the present invention without deviating from the spirit and scope of the invention. Therefore, the present invention should not be limited to any single embodiment, but rather construed in breadth and scope in accordance with the recitation of the appended claims.

The invention claimed is:

1. A combined transport optical fiber cable and optical fiber amplifier for carrying a high power laser beam in the optical fiber cable from a laser source and the laser beam has a fundamental mode and higher order and transverse modes, the transport optical fiber cable and optical fiber amplifier comprising:

a long length of large mode area, doped, clad fiber cable, the doped optical fiber cable amplifying a laser beam carried in the cable to overcome losses introduced by the cable; and a laser source for cladding pumping the large mode area optical fiber cable operating as a fiber cable amplifier;

wherein the optical fiber cable has at least one segment that is coiled to filter out the unwanted higher order modes and transverse modes by launching them into the cladding of the optical fiber cable in the coiled cable segment, and leaving only the fundamental mode of the laser beam that is amplified, and wherein the filtering and amplifying of only the fundamental mode enhances the laser beam quality and provides a near diffraction-limited laser beam exiting the optical fiber cable.

2. The combined transport optical fiber cable and optical fiber amplifier of claim 1 wherein the optical fiber cable is comprised of a phosphate glass, a photonic crystal fiber, or other silica compositions.

3. The combined transport optical fiber cable and optical fiber amplifier of claim 2 wherein the optical fiber cable is doped with a dopant comprising one of Ytterbium or Thulium.

4. The combined transport optical fiber cable and optical fiber amplifier of claim 3 wherein the optical fiber cable has an input end and an output end and the high power laser beam is focused onto the input end of the of the optical fiber cable by a lens.

5. The combined transport optical fiber cable and optical fiber amplifier of claim 4 wherein the length of the optical fiber cable depends on the concentration of the dopant in the cable and fiber non-linear effects, for silica fiber cables the dopant range is typically from 2% to 4% and for phosphate fiber cables the concentration of the dopant in the cable can exceed 10%.

6. The combined transport optical fiber cable and optical fiber amplifier of claim 1 wherein the optical fiber cable is doped with a dopant comprising one of Ytterbium or Thulium.

7. The combined transport optical fiber cable and optical fiber amplifier of claim 6 wherein the optical fiber cable has an input end and an output end and the high power laser beam is focused onto the input end of the of the optical fiber cable by a lens.

8. The combined transport optical fiber cable and optical fiber amplifier of claim 4 wherein the length of the optical fiber cable depends on the concentration of the dopant in the cable and fiber non-linear effects, for silica fiber cables the dopant range is typically from 2% to 4% and for phosphate fiber cables the concentration of the dopant in the cable can exceed 10%.

9. The combined transport optical fiber cable and optical fiber amplifier of claim 1 wherein the optical fiber cable has an input end and an output end and the high power laser beam is focused onto the input end of the of the optical fiber cable by a lens.

10. The combined transport optical fiber cable and optical fiber amplifier of claim 1 wherein the amplification provided by the optical fiber amplifier compensates for laser power lost when the unwanted higher order modes and transverse modes are filtered out by launching them into the cladding of the optical fiber cable in the coiled cable segment.

11. The combined transport optical fiber cable and optical fiber amplifier of claim 5 wherein the amplification provided by the optical fiber amplifier compensates for laser power lost when the unwanted higher order modes and transverse modes are filtered out by launching them into the cladding of the optical fiber cable in the coiled cable segment.

12. The combined transport optical fiber cable and optical fiber amplifier of claim 8 wherein the amplification provided by the optical fiber amplifier compensates for laser power lost when the unwanted higher order modes and transverse modes are filtered out by launching them into the cladding of the optical fiber cable in the coiled cable segment.

13. A combined transport optical fiber cable and optical fiber amplifier for carrying a high power laser beam in the optical fiber cable from a laser source and the laser beam has a fundamental mode and higher order and transverse modes, the transport optical fiber cable and optical fiber amplifier comprising:

a long length of large mode area, Ytterbium doped, clad fiber cable, the Ytterbium doped optical fiber cable amplifying a laser beam having a wavelength of in the order of 1060 nanometers carried in the cable to overcome losses introduced by the cable; and a laser source having a wavelength of in the order of 900-980 nanometers for cladding pumping the large mode area optical fiber cable operating as a fiber cable amplifier;

wherein the optical fiber cable has at least one segment that is coiled to filter out unwanted higher order modes and transverse modes by launching them into the cladding of the optical fiber cable in the coiled cable segment, and leaving only the fundamental mode of the laser beam that is amplified, wherein the filtering and amplifying of only the fundamental mode enhances the laser beam quality and provides a near diffraction-limited laser beam exiting the optical fiber cable, and wherein the length of the optical fiber cable depends on the wavelength of the laser output from the cladding pump.

14. The combined transport optical fiber cable and optical fiber amplifier of claim 13 wherein the amplification provided by the optical fiber amplifier compensates for laser power lost when the unwanted higher order modes and transverse modes are filtered out by launching them into the cladding of the optical fiber cable in the coiled cable segment.

15. The combined transport optical fiber cable and optical fiber amplifier of claim 14 wherein the optical fiber cable has an input end and an output end and the high power laser beam is focused onto the input end of the of the optical fiber cable by a lens.

16. A combined transport optical fiber cable and optical fiber amplifier for carrying a high power laser beam in the optical fiber cable from a laser source and the laser beam has a fundamental mode and higher order and transverse modes, the transport optical fiber cable and optical fiber amplifier comprising:

a long length of large mode area, Thulium doped, clad fiber cable, the Thulium doped optical fiber cable amplifying a laser beam having a wavelength of in the order of 2000 nanometers carried in the cable to overcome losses introduced by the cable; and a laser source having a wavelength of in the order of 780 nanometers to 800 nanometers for cladding pumping the large mode area optical fiber cable operating as a fiber cable amplifier;

wherein the optical fiber cable has at least one segment that is coiled to filter out unwanted higher order modes and transverse modes by launching them into the cladding of the optical fiber cable in the coiled cable segment, and leaving only the fundamental mode of the laser beam that is amplified, wherein the filtering and amplifying of only the fundamental mode enhances the laser beam quality and provides a near diffraction-limited laser beam exiting the optical fiber cable, and wherein the length of the optical fiber cable depends on the wavelength of the laser output from the cladding pump.

17. The combined transport optical fiber cable and optical fiber amplifier of claim 16 wherein the amplification provided by the optical fiber amplifier compensates for laser power lost when the unwanted higher order modes and transverse modes are filtered out by launching them into the cladding of the optical fiber cable in the coiled cable segment.

18. The combined transport optical fiber cable and optical fiber amplifier of claim 17 wherein the optical fiber cable has an input end and an output end and the high power laser beam is focused onto the input end of the of the optical fiber cable by a lens.

19. A combined transport optical fiber cable and optical fiber amplifier for carrying a high power laser beam in the optical fiber cable from a laser source and the laser beam has a fundamental mode and higher order and transverse modes, the transport optical fiber cable and optical fiber amplifier comprising:

a long length of large mode area, doped, clad fiber cable, the doped optical fiber cable amplifying a laser beam carried in the cable to overcome losses introduced by the cable; and a laser source for cladding pumping the large mode area optical fiber cable operating as a fiber cable amplifier;

wherein the optical fiber cable is comprised of a phosphate glass, a photonic crystal fiber, or other silica compositions doped with a dopant comprising one of Ytterbium or Thulium and has at least one segment that is coiled to filter out the unwanted higher order modes and transverse modes by launching them into the cladding of the optical fiber cable in the coiled cable segment, and leaving only the fundamental mode of the laser beam that is amplified, wherein the optical fiber cable has an input end and an output end and the high power laser beam is focused onto the input end of the of the optical fiber cable by a lens, wherein the length of the optical fiber cable depends on the concentration of the dopant in the cable and fiber non-linear effects, for silica fiber cables the dopant range is typically from 2% to 4% and for phosphate fiber cables the concentration of the dopant in the cable can exceed 10%, wherein the amplification provided by the optical fiber amplifier compensates for laser power lost when the unwanted higher order modes and transverse modes are filtered out by launching them into the cladding of the optical fiber cable in the coiled cable segment, and wherein the filtering and amplifying of only the fundamental mode enhances the laser beam quality and provides a near diffraction-limited laser beam exiting the optical fiber cable.

* * * * *